E. D. GORHAM.
Cultivator.
No. 163,372.  Patented May 18, 1875.
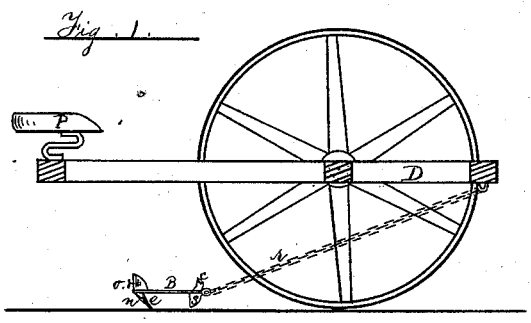
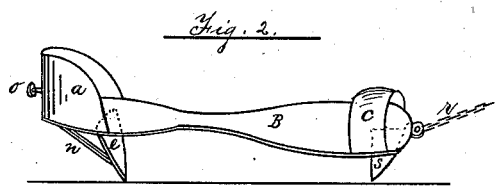
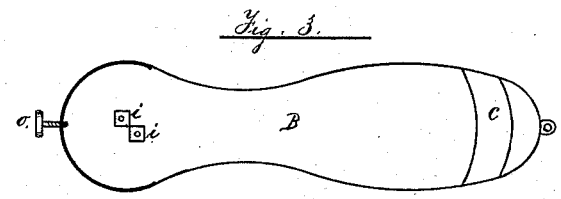
Witnesses
Thos. H. Hutchins
C. M. Bartlett
Inventor
Elijah D. Gorham

UNITED STATES PATENT OFFICE.

ELIJAH D. GORHAM, OF HADLEY, ILLINOIS.

IMPROVEMENT IN CULTIVATORS.

Specification forming part of Letters Patent No. 163,372, dated May 18, 1875; application filed April 12, 1875.

*To all whom it may concern:*

Be it known that I, ELIJAH D. GORHAM, of Hadley, in Will county and State of Illinois, have invented certain Improvements in Foot Corn-Cultivators, of which the following is a specification:

The nature of my invention consists in attaching to the feet of the operator a small cultivator-shoe, for the purpose of tilling grain, generally corn, to be used in connection with any of the ordinary sulky-cultivators, which are arranged for the operator to ride on; the construction and operation of which I will proceed to explain, reference being had to the annexed drawings, making a part of this specification, in which—

Figure 1 is a side elevation of the device, shown in connection with a cultivator; Fig. 2, a perspective view; and Fig. 3, a plan view on the top of the device.

The device before mentioned may be constructed of any suitable material, but generally entirely of metal, and may be of the shape particularly shown in Fig. 2, in which B represents a strip of wood or metal about the shape and size of the sole of the boot; a, the counter or heel-support with the set-screw o to set against the heel of the boot to hold it on; c, a toe-strap to hold the front end on the toe; e, the shovel-blade; n, a brace in the rear to support the blade; s, a sharp guiding-colter; and r, a chain or cord attached to the front end of the shoe B, and the other end to the front end of the frame D of the cultivator to pull it along.

Fig. 1 shows the device as it appears in practical operation, the *modus operandi* of which is as follows: The operator attaches one of the shoes B to each foot, and takes his place in the seat P of the cultivator. As the cultivator advances it drags the shoe B after it, and the operator can, by turning his toes in or out slightly, guide the shoes so he can work the ground in between the hills of grain, and extremely near to the hill, with great ease and effectiveness, which it is impossible to do with the ordinary shovels of the plow.

The shovel e and colter s may be attached to the under side of the sole B in any manner most practicable, but generally as shown in Fig. 3, the upper end of the shovel being slit, and the two parts being turned in opposite directions from each other, as shown at i, and riveted to the sole B of the shoe.

This device is calculated to work that part of the ground where the row is where the shovels of the plow cannot reach. The shovels of the plow generally leave a strip of ground several inches in width, on which the hills of grain stand, and the only way to reach in between the hills is generally to plow across the other way, which can be almost entirely obviated by the use of this device. In operation the feet guide the device so as to plow up to and around the hills in the strip of earth left by the shovels of the cultivator, usually called the row, which makes it unnecessary to plow crosswise with the corn-plow. By using one of these foot-cultivators on each foot, all of the ground in between the hills of grain can be reached up close to the hill.

Having thus described my invention, what I claim as new, and desire to secure by Letters Patent, is as follows:

The foot cultivating-shoe described, consisting of the sole B, shovel e, brace n, colter s, heel-support a, and set-screw o, all constructed, arranged, and operating, as and for the purposes set forth.

ELIJAH D. GORHAM.

Witnesses:
 THOS. H. HUTCHINS,
 T. P. FORD.